US012096168B2

(12) United States Patent
Brody

(10) Patent No.: US 12,096,168 B2
(45) **Date of Patent: *Sep. 17, 2024**

(54) SPEAKER MOUNT WITH SPRING-LOADED LATCH

(71) Applicant: Biamp Systems, LLC, Beaverton, OR (US)

(72) Inventor: Michael Alan Brody, Haddon Heights, NJ (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,343

(22) Filed: Aug. 31, 2023

(65) Prior Publication Data

US 2023/0412951 A1 Dec. 21, 2023

Related U.S. Application Data

(63) Continuation of application No. 17/325,104, filed on May 19, 2021, now Pat. No. 11,785,367.

(51) Int. Cl.
*H04R 1/02* (2006.01)

(52) U.S. Cl.
CPC ............. *H04R 1/026* (2013.01); *H04R 1/025* (2013.01); *H04R 2201/021* (2013.01)

(58) Field of Classification Search
CPC ... H04R 1/026; H04R 1/025; H04R 2201/021
See application file for complete search history.

(56) References Cited

U.S. PATENT DOCUMENTS 10,848,844 B2 11/2020 Brousseau
11,064,275 B2 7/2021 Mai
11,785,367 B2 * 10/2023 Brody .................... H04R 1/025 381/386
2010/0155556 A1 6/2010 Nelson et al.
2015/0084347 A1 * 3/2015 Olsson ...................... E05C 1/08 292/137
2021/0076515 A1 * 3/2021 Mai ...................... H05K 5/0204

OTHER PUBLICATIONS

International Search Report issued in the related International Application No. PCT/US2022/030123, mailed on Jul. 5, 2022.

* cited by examiner

*Primary Examiner* — Andrew Sniezek

(57) ABSTRACT

An example device may include a housing with a number of latches with curved faces to permit contact and manipulation when in contact with a surface. The example may include a housing having spring-loaded angled and sloped latches disposed along the outside of the housing, and a face plate on a bottom portion of the housing.

17 Claims, 8 Drawing Sheets

SPEAKER MOUNT WITH SPRING-LOADED LATCH

CROSS-REFERENCE TO RELATED APPLICATIONS

This application is a continuation of U.S. patent application Ser. No. 17/325,104, filed on May 19, 2021, now U.S. Pat. No. 11,785,367, issued on Oct. 10, 2023, the entire disclosure of which is incorporated by reference herein.

TECHNICAL FIELD

This application generally relates to a speaker mount and in particular a spring-loaded speaker mount for securing a speaker to a recessed area.

BACKGROUND

In a workplace, conference area, public forum or other environment, the audio producing speakers may be arranged in a configuration that covers multiple floors, open areas and different sized rooms. Ceiling or wall mounted speakers are a popular choice, however, the ease of installation continues to drive new development strategies.

SUMMARY

One example embodiment may provide an apparatus including a housing and a plurality of latches with curved faces.

Another example embodiment includes an apparatus including a housing comprising a plurality of spring-loaded angled and sloped latches disposed in a respective plurality of recessed portions of the housing exterior, and a face plate on a bottom portion of the housing.

Another example embodiment includes an apparatus including a housing comprising a plurality of spring-loaded angled and sloped latches disposed in a respective plurality of recessed portions of the housing exterior, and each of the latches is disposed on a screw column and are spring-loaded by a torsion spring having axes that are parallel perpendicular to the screw column.

Another example embodiment includes an apparatus including a housing comprising a plurality of spring-loaded angled and sloped latches disposed in a respective plurality of recessed portions of the housing exterior and further disposed on respective screw columns, wherein a topmost portion of each of the latches comprises an angled abutment and a top portion of the screw column comprises a reverse angled abutment that is substantially opposite to a position of the angled abutment.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases “example embodiments”, “some embodiments”, or other similar language, throughout this specification refers to the fact that a particular feature, structure, or characteristic described in connection with the embodiment may be included in at least one embodiment. Thus, appearances of the phrases “example embodiments”, “in some embodiments”, “in other embodiments”, or other similar language, throughout this specification do not necessarily all refer to the same group of embodiments, and the described features, structures, or characteristics may be combined in any suitable manner in one or more embodiments.

Figure 1:
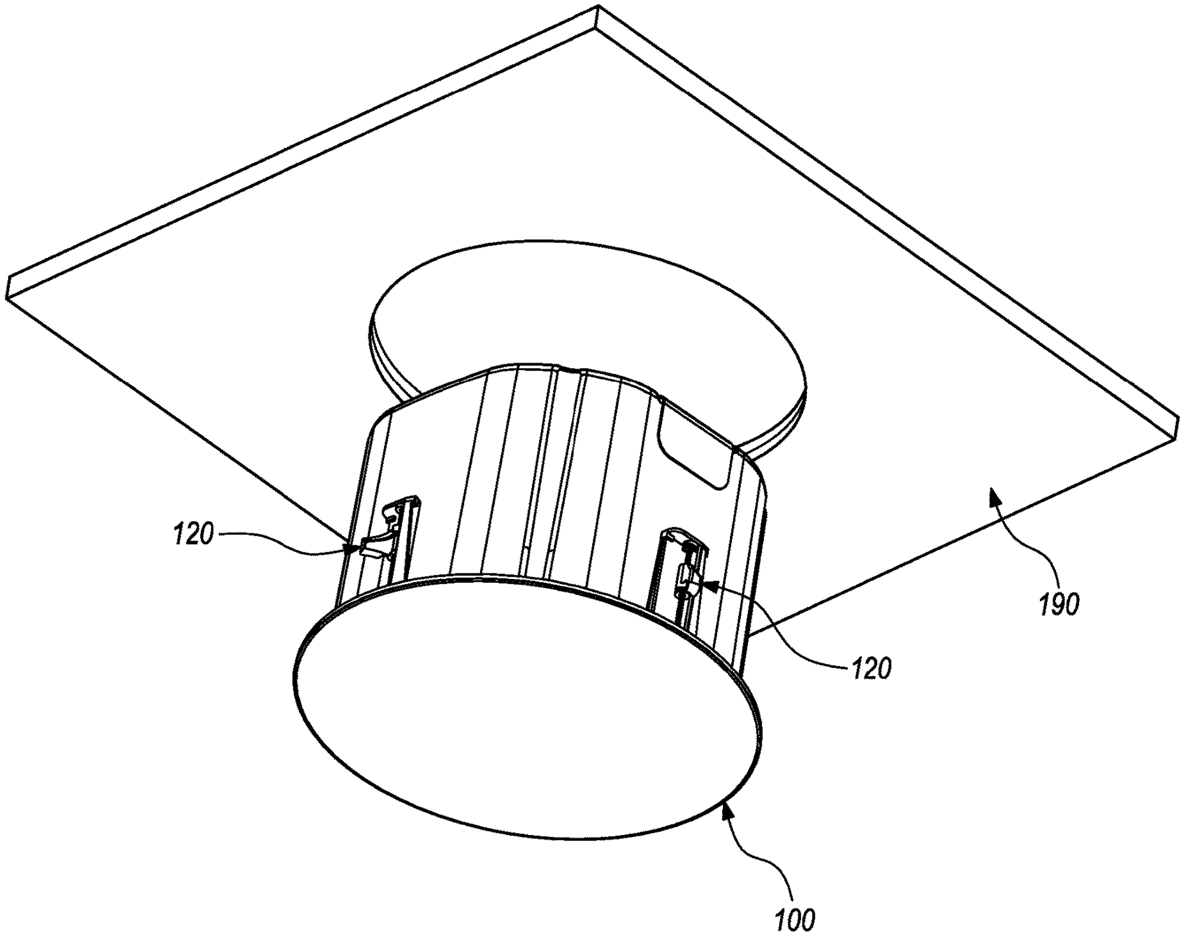
FIG. 1 illustrates a speaker mount with a plurality of locking mechanisms according to example embodiments.

Example embodiments provide a speaker housing or similar styled-box in a rectangular or circular-shaped container. The housing may have four sides with one latch 120 per side, or more, or fewer. The housing body is generally smaller than the speaker face plate 100, as illustrated in FIG. 1. The ceiling panel 190 may be a panel or portion of drywall cut-out so the housing can pass-through and become locked into a holding position by the latches 120 resting against a top surface of the panel 190.

FIG. 1 illustrates a speaker mount with a plurality of locking mechanisms according to example embodiments. Referring to FIG. 1, the latches 120 may be on all side or two or more sides of the housing. The face of the speaker 100 may be exposed while the housing is recessed into a wall or ceiling panel 190 and held in place by the spring-loaded latches 120.

Figure 2:
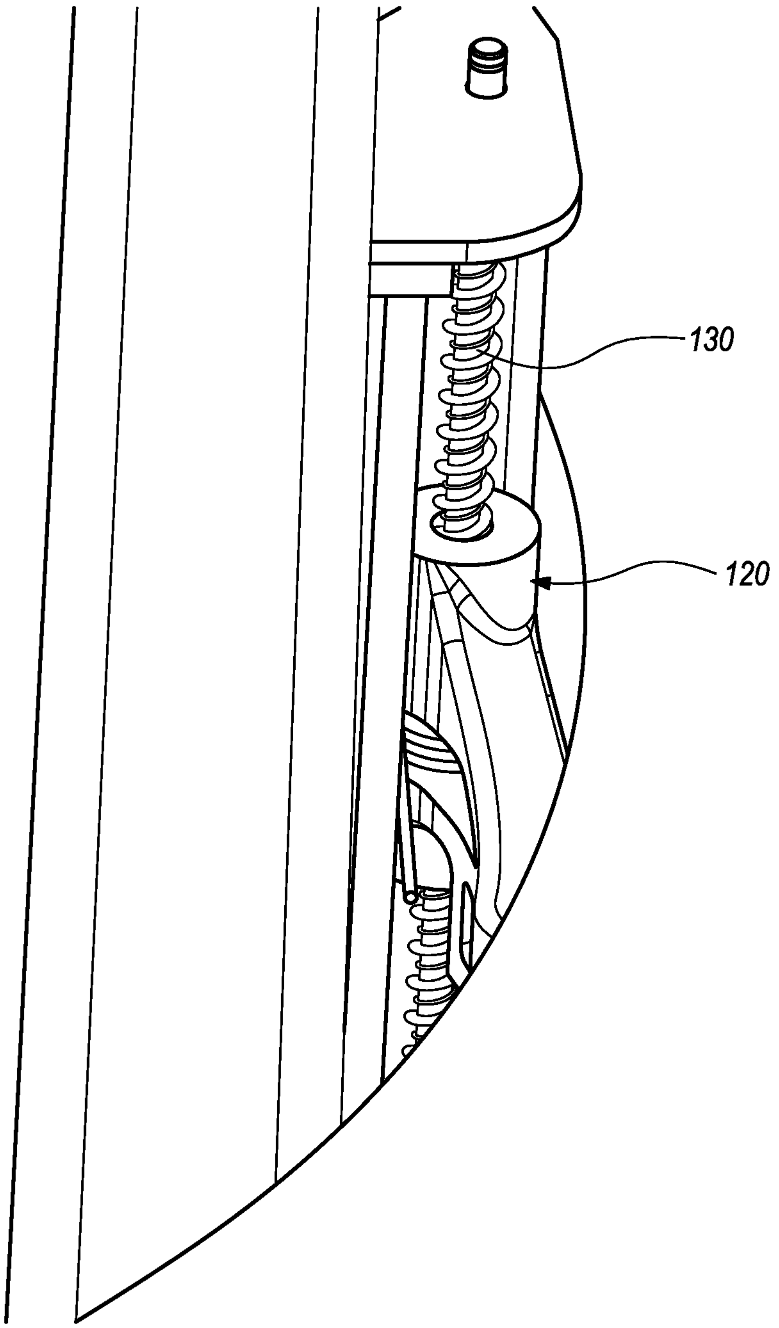
FIG. 2 illustrates an upper view of the spring-loaded latch resting in a partially closed position according to example embodiments.

FIG. 2 illustrates an upper view of the spring-loaded latch resting in a partially closed position according to example embodiments. Referring to FIG. 2, the example demonstrates the latch 120 being in a closed position with the body of the latch 120 being turned towards the housing along the axis of the screw column 130, which may be controlled by a screw interface on one end of the screw mount. When the speaker housing is passed into the opening of the ceiling or wall, the turning of the housing by a user’s hand or other mechanism may cause the curved slide and angled body of the latch 120 to move towards the housing until it is free to pop open again via the screw position column 130 once the latch has passed the plane of a resting surface of the opening. While in the opening, the latch 120 may easily roll against the resting surface of the opening and remain closed. All the latches may undergo a similar position technique when fitting the housing through an opening.

Figure 3:
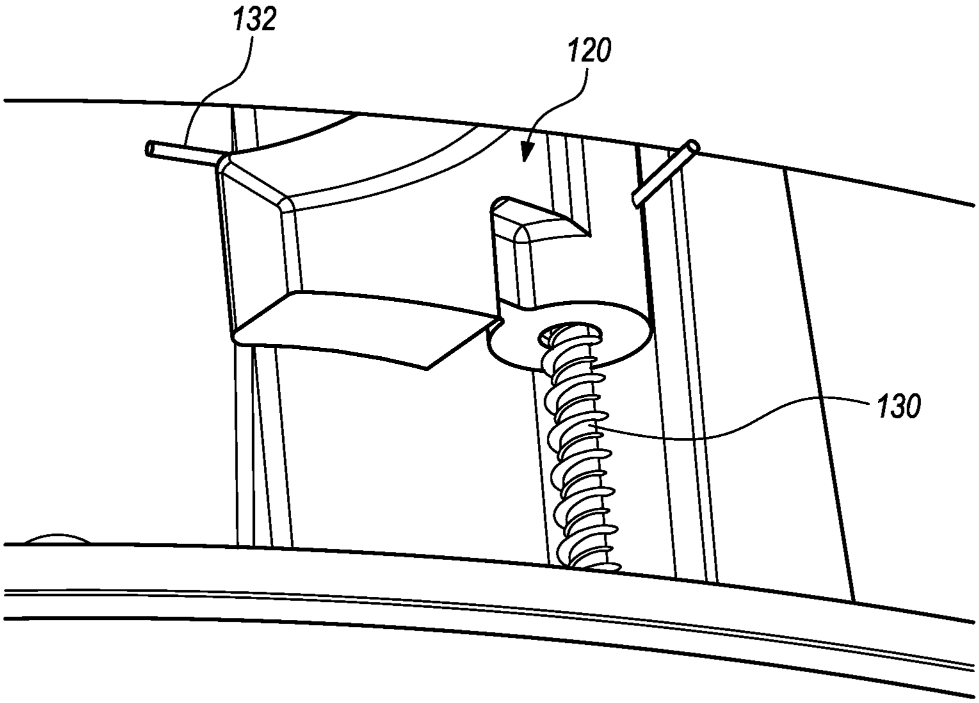
FIG. 3 illustrates a lower view of the spring-loaded latch resting in a partially closed position according to example embodiments.

FIG. 3 illustrates a lower view of the spring-loaded latch resting in a partially closed position according to example embodiments. Referring to FIG. 3, the latch 120 is illustrated with a torsion spring 132 that is disposed behind the latch body with one axis of the torsion spring being 90 degrees from the other as it pivots along the screw column 130. The latch is sliding into a closed position as the lip of the ceiling presses against the latch.

Figure 4:
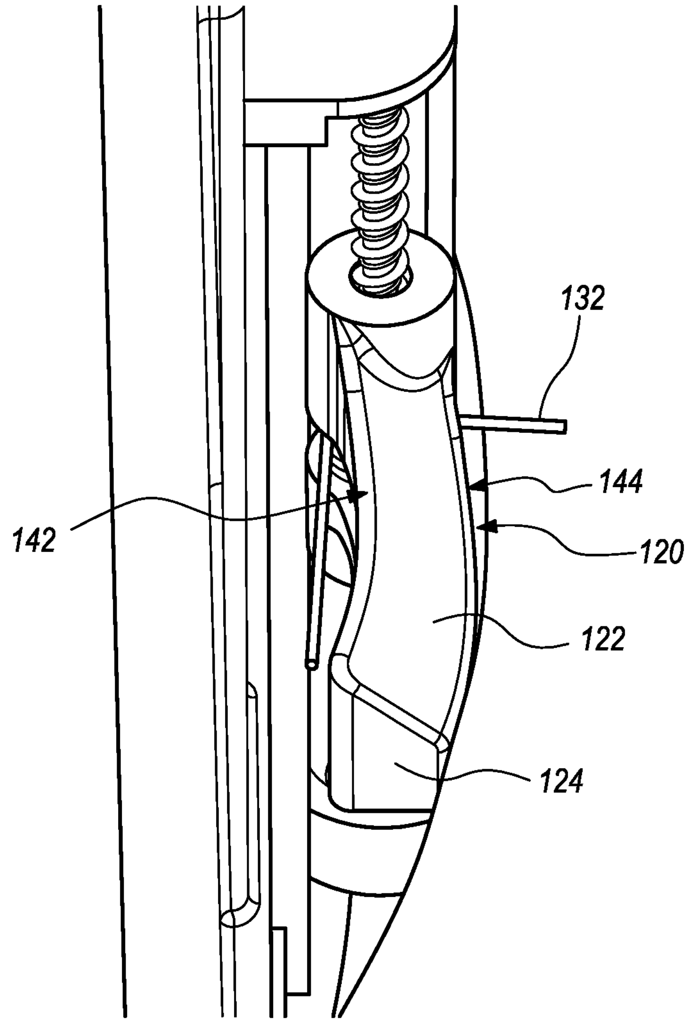
FIG. 4 illustrates a sideways view of the spring-loaded latch resting in a closed position according to example embodiments.

FIG. 4 illustrates a sideways view of the spring-loaded latch resting in a closed position according to example embodiments. Referring to FIG. 4, the body of the latch 120 includes a slide-like face 122 that has an angle sloping downward from a top view position. The angle may be between 20 and 70 degrees permitting the sloped area of the face 122 to be easily slid against a surface to move the latch 120 back towards the housing when pushing the housing through a drywall/ceiling tile opening with a lip. Most openings have a rigid lip surface that can act as a guide for the latch to roll back towards the body as a resistance is provided from the torsion spring 132. The end of the latch 124 has a trapezoidal shape that demonstrates the angle of the latch face 122. Additionally, the latch may be shaped like a curved playground slide where the topmost portion is angled downward and sloped downward. The latch may also be compared to a long dog ear that slopes down and curves along with downward position. The portion of the latch 120 that is nearest the housing in a closed position may be bowed inward towards the housing as identified from angled portion 142. The exterior portion may be bowed outward 144 from the body of the housing.

Figure 5:
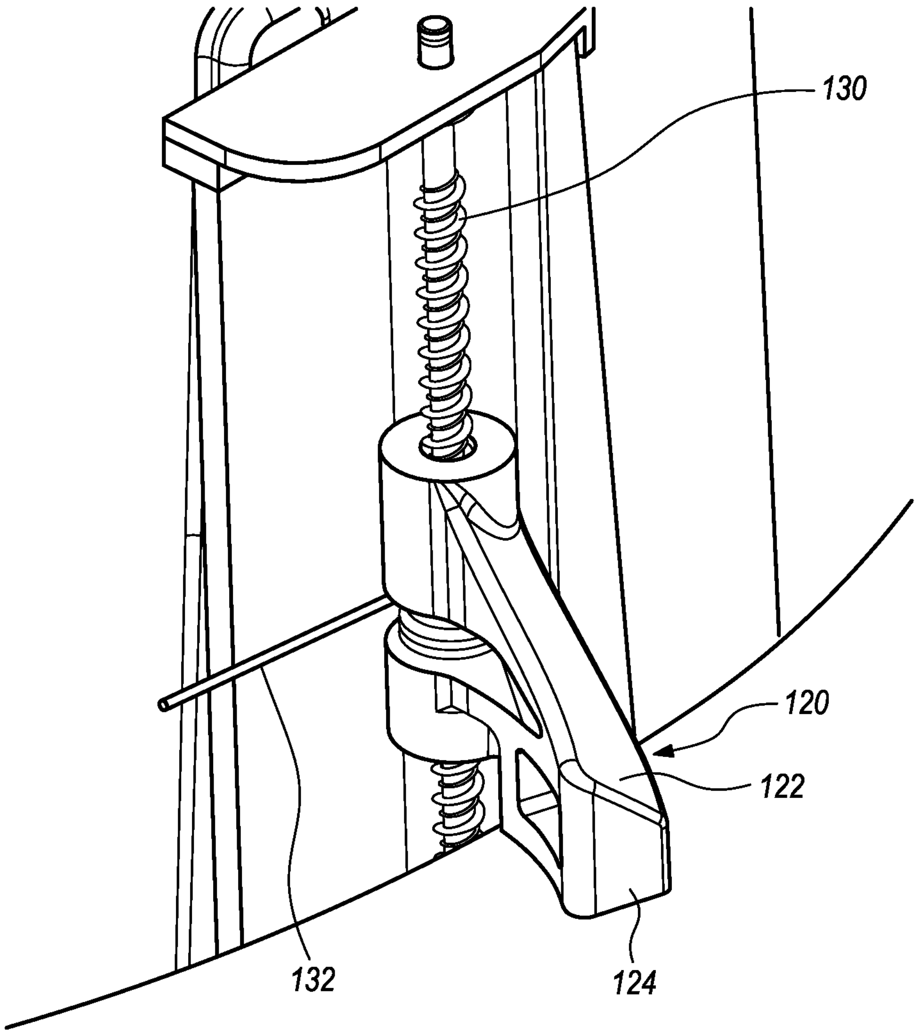
FIG. 5 illustrates a sideways view of the spring-loaded latch resting in an open position according to example embodiments.

FIG. 5 illustrates a sideways view of the spring-loaded latch resting in an open position according to example embodiments. Referring to FIG. 5, the latch 120 has passed through the opening and is now in an open position maintained by the torsion spring 132. Once open the latch may rest against the topmost surface of the ceiling or wall tile or similar material.

Figure 6:
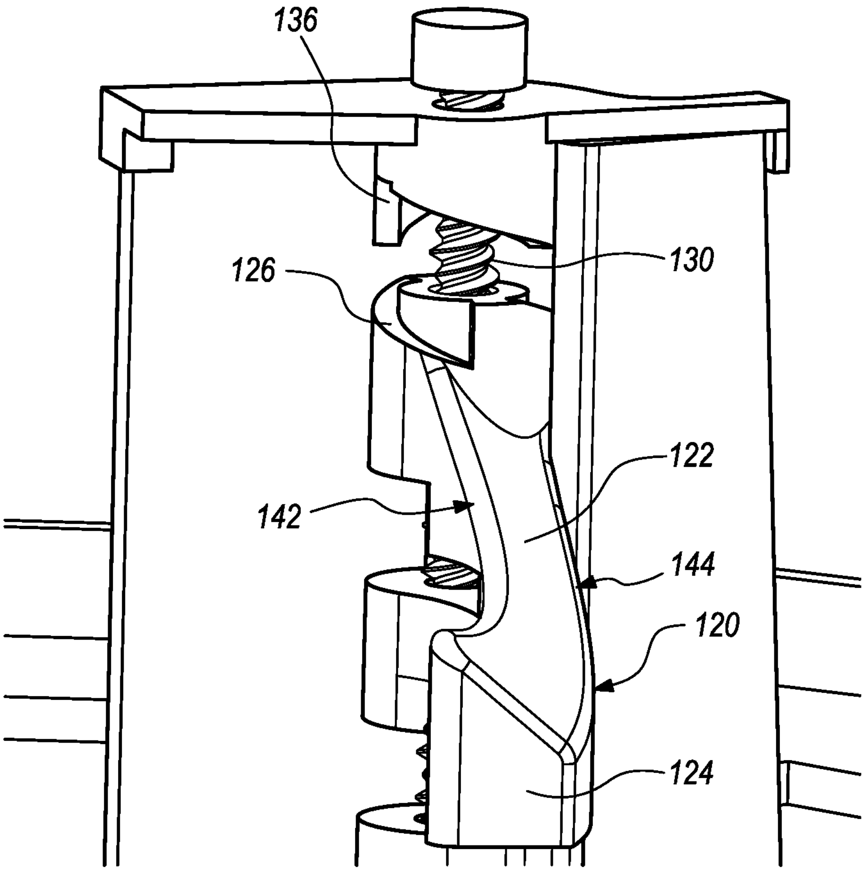
FIG. 6 illustrates a sideways view of the spring-loaded latch resting in an open position near the top of the screw column according to example embodiments.

FIG. 6 illustrates a sideways view of the spring-loaded latch resting in an position near the top of the screw column according to example embodiments. Referring to FIG. 6, the top of the screw column may have a receiving fitting that is angled and which includes an abutment 136 that holds the top of the latch in place by a similar fitting 126 with an angled surface designed to match the surface of the abutment 136 and to provide a locked latch position along the screw column axis 130. The screw 130 is exposed in this example since the latch has not been raised and rotated to the top position of the column.

Figure 7:
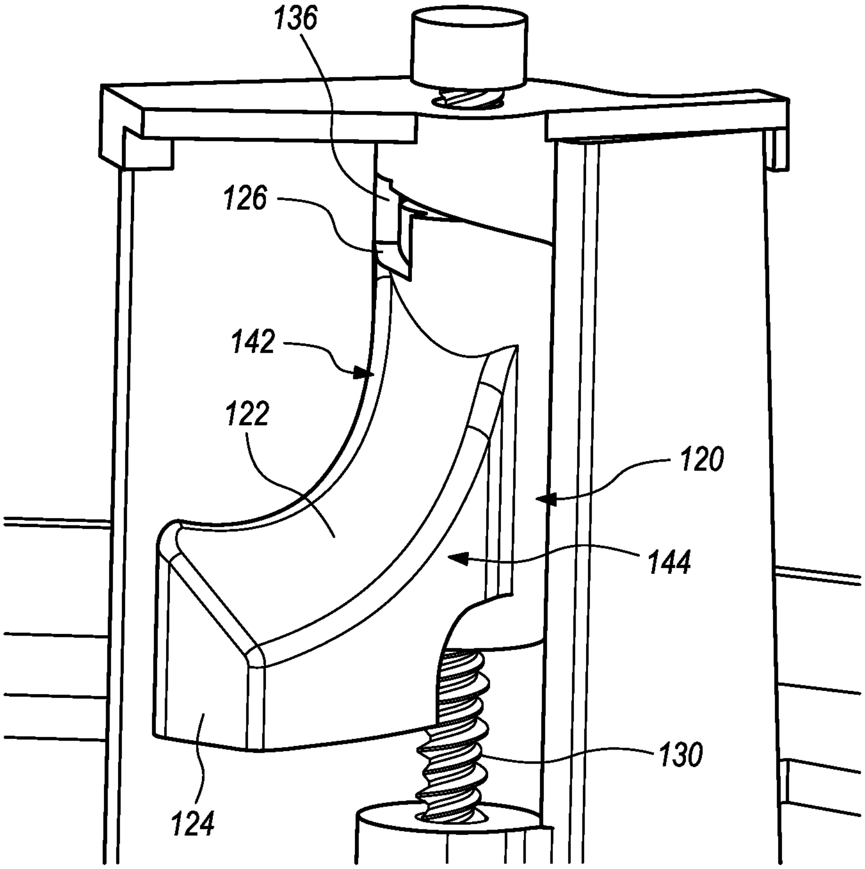
FIG. 7 illustrates a sideways view of the spring-loaded latch resting in a partially open position near the top of the screw column according to example embodiments.

FIG. 7 illustrates a sideways view of the spring-loaded latch resting in a partially open position near the top of the screw column 130 according to example embodiments. Similar to FIG. 6, the example in FIG. 7 demonstrates the top of the latch matching the top abutment 136 of the column structure in an almost completely locked position.

Figure 8:
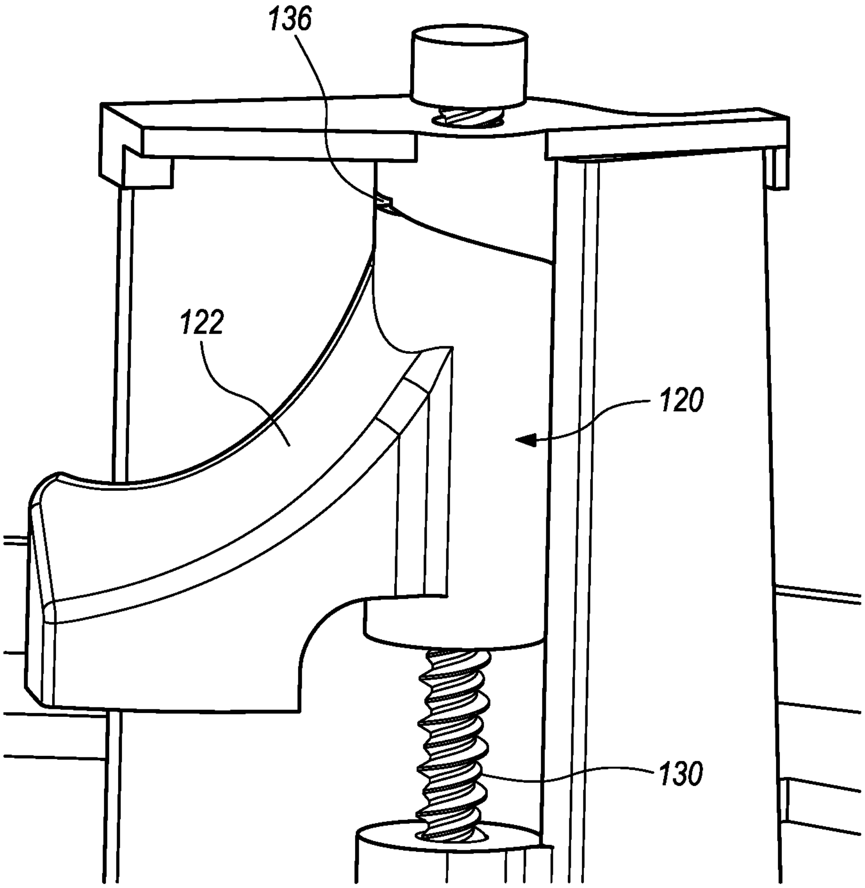
FIG. 8 illustrates a sideways view of the spring-loaded latch resting in a closed position at the top of the screw column according to example embodiments.

FIG. 8 illustrates a sideways view of the spring-loaded latch resting in a closed position at the top of the screw column according to example embodiments. Similar to FIG. 7, the latch 120 is resting against the top abutment 136 of the column structure, however, in this example, the latch 120 is in a fully turned position and is recessed and turned towards the body of the housing. The latch 120 may turn approximately 90 degrees into and away from the housing body.

In operation, the installation includes inserting the housing into an opening, turning the housing body to maneuver the latches towards the housing body, once past the surface of the opening, the latches may be opened by a force from the torsion springs, and the screw may be turned by the operator to move and lock the latches 120 into the top portion of the screw column.

One example may include an apparatus that includes a housing with a plurality of spring-loaded angled and sloped latches disposed in a respective plurality of recessed portions (see FIG. 1) of the housing exterior and a face plate on a bottom portion of the housing.

Each of the latches is disposed on a screw column and is spring-loaded by a torsion spring having axes that are parallel to the screw column. The end of each of the latches may be a trapezoidal shape (see 124 of FIG. 4). The angle of a top surface of each of the latches is between 20 and 70 degrees as it slopes from the inner portion having the bowed-in surface 142 towards the outer portion having the bowed-out surface 144. A topmost portion of each of the latches includes an angled abutment 126 and a top portion of the screw column comprises a reverse angled abutment that is substantially opposite to a position of the angled abutment as denoted by 136. The edge of 136 may engage the slide groove of 126 until the edge 136 reaches the edge of slide surface 122, in which case the latch is in a locked position. Each of the latches comprises a top surface that bows inward 142 on a side closest to the housing when in a closed position and bows outward 144 on a side away from the housing when in the closed position. The top surfaces of the latches are angled downward from the inward bowed side to the outward bowed side.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications.

What is claimed is:

1. An apparatus, comprising:

a plurality of spring-loaded latches, wherein each spring-loaded latch of the plurality of spring-loaded latches is rotatably affixed to a corresponding screw column having a longitudinal axis and rotates about the longitudinal axis; and a torsion spring that rotatably biases each spring-loaded latch around the longitudinal axis into an open position, wherein each spring-loaded latch of the plurality of spring-loaded latches further comprises an angled abutment comprising a slide groove, and wherein the screw column further comprises:

a reverse-angled abutment comprising an angle that is substantially opposite to an angle of the angled abutment and an edge that is configured to rotatably engage the slide groove when the slide groove rotates under the edge until the reverse-angled abutment and the angled abutment are contiguous and in a locked position.

2. The apparatus of claim 1, wherein an axis of the torsion spring is parallel to the screw column.

3. The apparatus of claim 1, wherein an end of each of the spring-loaded latches is a trapezoidal shape.

4. The apparatus of claim 1, wherein the angled abutment comprises an angle of between 20 and 70 degrees.

5. The apparatus of claim 1, wherein a top surface of each spring-loaded latch of the plurality of spring-loaded latches is angled downward from an inward bowed side of each spring-loaded latch to an outward bowed side of each spring-loaded latch.

6. The apparatus of claim 1, wherein a top surface of each spring-loaded latch of the plurality of spring-loaded latches is angled downward from a portion of the top surface nearest the longitudinal axis to a portion of the top surface furthest from the longitudinal.

7. An apparatus, comprising:

a housing;

a plurality of screw columns affixed to the housing, wherein each screw column comprises a longitudinal axis; and a plurality of spring-loaded latches, wherein each spring-loaded latch of the plurality of spring-loaded latches is rotatably affixed to a corresponding screw column of the plurality of screw columns, and is rotatably biased into an open position about the longitudinal axis by a torsion spring disposed about the longitudinal axis, wherein each spring-loaded latch of the plurality of spring-loaded latches further comprises an angled abutment comprising a slide groove, and wherein the screw column further comprises:

a reverse-angled abutment comprising an angle that is substantially opposite to an angle of the angled abutment and an edge that is configured to rotatably engage the slide groove when the slide groove rotates under the edge until the reverse-angled abutment and the angled abutment are contiguous and in a locked position.

8. The apparatus of claim 7, wherein an end of each of the spring-loaded latches is a trapezoidal shape.

9. The apparatus of claim 7, wherein the angled abutment comprises an angle of between 20 and 70 degrees.

10. The apparatus of claim 7, wherein a top surface of each spring-loaded latch of the plurality of spring-loaded latches is angled downward from an inward bowed side of each spring-loaded latch to an outward bowed side of each spring-loaded latch.

11. The apparatus of claim 7, wherein a top surface of each spring-loaded latch of the plurality of spring-loaded latches is angled downward from a portion of the top surface nearest the longitudinal axis to a portion of the top surface furthest from the longitudinal axis.

12. An apparatus, comprising:

a plurality of spring-loaded latches, wherein each spring-loaded latch of the plurality of spring-loaded latches is rotatably affixed to a corresponding screw column having a longitudinal axis and rotates about the longitudinal axis; and a torsion spring that rotatably biases each spring-loaded latch around the longitudinal axis into an open position, wherein each spring-loaded latch of the plurality of spring-loaded latches further comprises an angled abutment comprising a slide groove, and wherein the screw column further comprises:

a reverse-angled abutment comprising an angle that is substantially opposite to an angle of the angled abutment and an edge that is configured to rotatably engage the slide groove when the slide groove rotates under the edge until the reverse-angled abutment and the angled abutment are contiguous and in a locked position, wherein a top surface of each spring-loaded latch of the plurality of spring-loaded latches is angled downward from a portion of the top surface nearest the longitudinal axis to a portion of the top surface furthest from the longitudinal axis.

13. The apparatus of claim 12, wherein each of the spring-loaded latches is angled, sloped, and bowed.

14. The apparatus of claim 12, wherein an axis of the torsion spring is parallel to the screw column.

15. The apparatus of claim 12, wherein an end of each of the spring-loaded latches is a trapezoidal shape.

16. The apparatus of claim 12, wherein the angled abutment comprises an angle of between 20 and 70 degrees.

17. The apparatus of claim 12, wherein a top surface of each spring-loaded latch of the plurality of spring-loaded latches is angled downward from an inward bowed side of each spring-loaded latch to an outward bowed side of each spring-loaded latch.

* * * * *